UNITED STATES PATENT OFFICE.

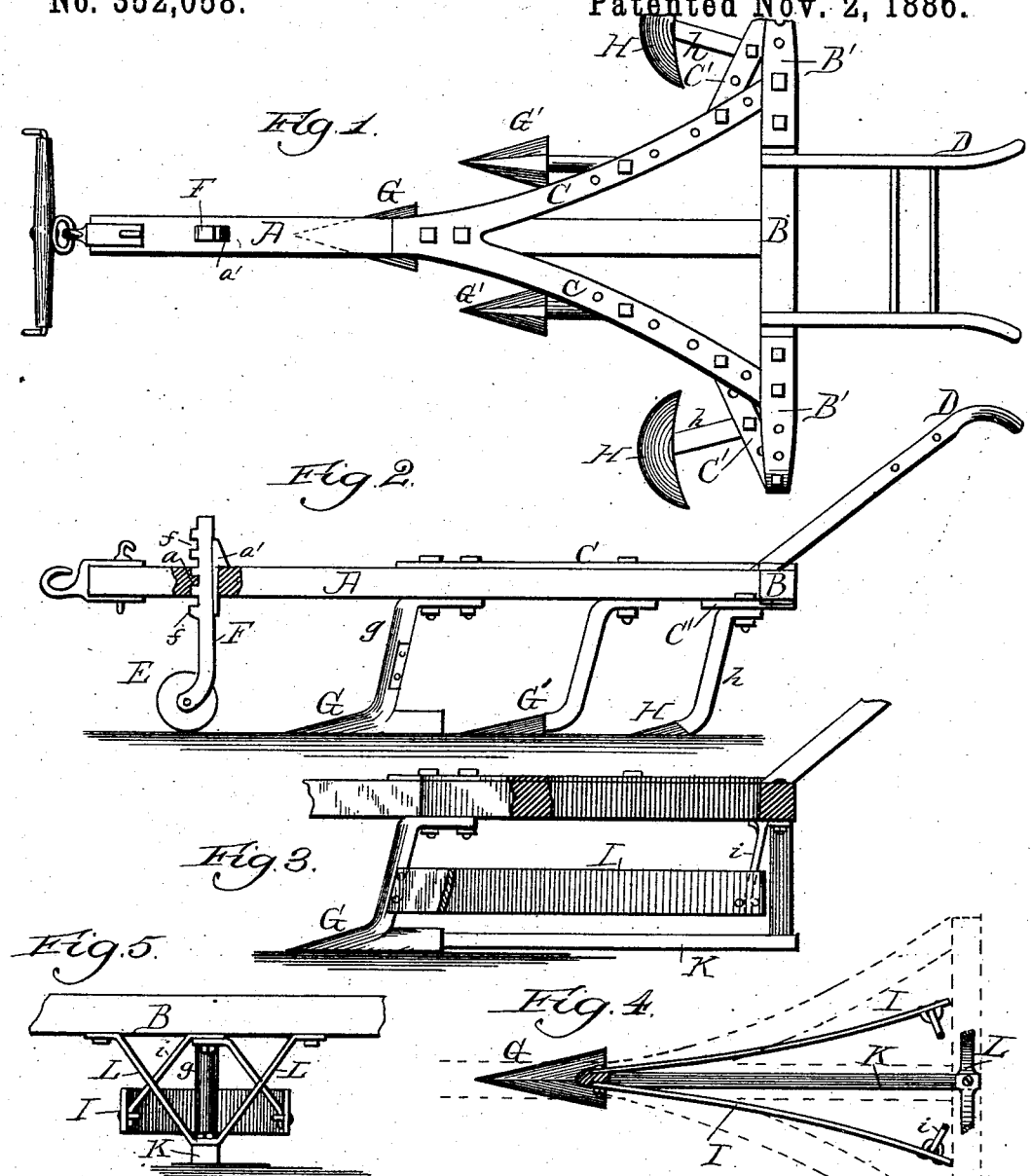

PETER KAISER, OF EAST DUBUQUE, ILLINOIS.

CULTIVATOR.

SPECIFICATION forming part of Letters Patent No. 352,058, dated November 2, 1886.

Application filed March 19, 1886. Serial No. 195,869. (No model.)

*To all whom it may concern:*

Be it known that I, PETER KAISER, a citizen of the United States, residing at East Dubuque, Jo Daviess county, Illinois, have invented certain new and useful Improvements in Cultivators, of which the following is such a full, clear, and exact description of the invention as will enable others skilled in the art to which it appertains to make and use the same, reference being had to the accompanying drawings, which form a part thereof.

The invention consists in the novel construction and combination of devices, herein shown and described, and more specifically pointed out in the claims.

In said drawings, Figure 1 illustrates in a plan view a cultivator embodying my invention. Fig. 2 is a side view of the same. Fig. 3 is a side view of my improved cultivator when arranged for "hilling," Fig. 4 showing a plan, and Fig. 5 a rear view, of the same. Fig. 6 is a detail rear view of one of the braces.

Similar letters of reference indicate like parts throughout the specification and several figures.

In said drawings, the letter A represents the beam of a cultivator, provided at its end with the usual whiffletree. The cross-bar B, brace-rods C, and handles D are constructed in the ordinary manner, as shown. The colter-wheel E is journaled in the lower end of the arm F, said arm extending upward through a slot in the beam A, and having on one face a rack, $f$, or a series of teeth, which engage with the tooth or projection $a$ in the said slot. A wedge, $a'$, holds the rack in engagement. The rack may be disengaged and the colter-wheel raised and lowered as required by first withdrawing the wedge $a'$.

The foremost plowshare, G, is rigidly secured to the frame, as shown, by means of the depending arm $g$. Similarly-shaped but preferably smaller shares, G', are secured, one to each of the brace-rods C, which rods are provided with a number of bolt-holes, so as to permit of the adjustment of the plowshares G' at the will of the user. Bolted or otherwise removably secured to the cross-bar B, at each end, are the short metallic extension-bars B'. Secured at one end of these bars B' and at the other end to the brace-rods C are the other extensions, C', as shown, and to each of these extensions C' are secured adjustably, by means of the depending arms $h$, the semicircular knives H.

This style of implement I prefer to make about four feet in width, and find it very serviceable in cultivating corn. When the rows are closer together, I remove the knives H and the plowshares G', and also the extensions B' and C', and then I secure the knives H to the brace-rods C. This gives a very serviceable and light cultivator of about two and a half feet in width. In hilling up crops, I remove the parts H, G', B', and C', above mentioned, and attach the front ends of the mold-boards I to the depending arm $g$ of the share G, as illustrated in Fig. 3, while at the rear end of each mold-board is secured the lower end of the adjusting and supporting rods $i$. The rods $i$ are secured adjustably to the under side of the cross-bars B by means of proper bolt-holes, as shown, so that the rear ends of the mold-boards I can be brought together or spread apart, as desired. On the rear end of the front plowshare is a hub or projection provided with a socket, into which is screwed or otherwise secured the front end of a steel guide rod or bar, K, which extends to the rear, and is secured to and connected with the cross-bar B by means of the bent brace-rods L, as shown in Figs. 3 and 5.

I prefer to make the plowshares G G', the knives H, and also the rods K of steel, and the other parts of cast metal. The beam A and the cross-bar B may, however, be made of wood.

My cultivator can readily be drawn by one horse, and it works equally well on hilly and on level ground. The depth of cut may be regulated by the colter-wheel. It takes one row at a time and cuts off the weeds at the roots, removing them from their places and preventing their taking root again. The soil falls back into the furrows, and the crops are therefore not covered up.

In hilling up potatoes and other crops which spread out, my cultivator raises the plants to an upright position and leaves the soil in rows between the plants.

Having now described my invention, what I claim, and desire to secure by Letters Patent, is as follows:

1. In a cultivator, the beam A, provided with an adjustable colter-wheel, E, the bar B, and the rods C, in combination with share G, removable extensions B', shares G', and knives H, whereby mold-boards can be attached and the implement converted into a hiller, substantially as described.

2. In a cultivator, the combination of the beam A, provided with adjustable colter-wheel E, bar B, rods C, removable extensions B', plowshares G G', and the knives H, substantially as and for the purpose specified.

PETER KAISER.

Witnesses:
HUGO APFELD,
J. R. ELSKAMP.